(12) United States Patent
Fujioka et al.

(10) Patent No.: US 12,157,373 B2
(45) Date of Patent: Dec. 3, 2024

(54) BATTERY HEATER FAILURE DIAGNOSTIC DEVICE FOR VEHICLE

(71) Applicant: Mazda Motor Corporation, Hiroshima (JP)

(72) Inventors: Shinya Fujioka, Aki-gun (JP); Atsushi Yoshimoto, Aki-gun (JP); Yuki Ida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 298 days.

(21) Appl. No.: 17/946,256

(22) Filed: Sep. 16, 2022

(65) Prior Publication Data

US 2023/0103895 A1 Apr. 6, 2023

(30) Foreign Application Priority Data

Oct. 1, 2021 (JP) ................. 2021-162919

(51) Int. Cl.
*B60L 58/27* (2019.01)
*B60L 3/00* (2019.01)
(Continued)

(52) U.S. Cl.
CPC ............. *B60L 3/0023* (2013.01); *B60L 58/27* (2019.02); *G07C 5/0808* (2013.01); *H01M 10/46* (2013.01); *H01M 10/482* (2013.01); *H01M 10/615* (2015.04); *H01M 10/625* (2015.04); *H01M 10/63* (2015.04); *H01M 10/657* (2015.04); *H02J 7/0047* (2013.01);
(Continued)

(58) Field of Classification Search
None
See application file for complete search history.

(56) References Cited

U.S. PATENT DOCUMENTS

| 7,089,955 B1* | 8/2006 | Komro, Sr. ............. B60R 15/00 137/341 |
| 9,679,448 B2* | 6/2017 | Koosha .................. H05B 45/10 |
| 2019/0025839 A1* | 1/2019 | Manjunath ........... G05D 1/0259 |

FOREIGN PATENT DOCUMENTS

JP 2021097028 A 6/2021

OTHER PUBLICATIONS

Mariño et al., Instrumentation for an Urban Series-PHEV Bus With Onboard-Based Sensors and Automotive Network Standards, 2009, IEEE, p. 1900-1910 (Year: 2009).*

(Continued)

*Primary Examiner* — McDieunel Marc
(74) *Attorney, Agent, or Firm* — Alleman Hall & Tuttle LLP

(57) ABSTRACT

To provide a battery heater failure diagnostic device for a vehicle capable of diagnosing failure of a battery heater with a high degree of accuracy, a battery output sensor capable of detecting a battery output value that is a current value or a voltage value of a battery is provided. When a specified failure diagnosis condition is satisfied, a first control for stopping actuation of a battery heater and at least one non-heater device and a second control for actuating the battery heater while maintaining a stop of the actuation of the at least one non-heater device after execution of the first control are executed. The failure of the battery heater is diagnosed based on battery output values detected by the battery output sensor during execution of the first control and during execution of the second control.

20 Claims, 8 Drawing Sheets

(51) Int. Cl.
  *G07C 5/08*   (2006.01)
  *H01M 10/46*  (2006.01)
  *H01M 10/48*  (2006.01)
  *H01M 10/615*  (2014.01)
  *H01M 10/625*  (2014.01)
  *H01M 10/63*  (2014.01)
  *H01M 10/657*  (2014.01)
  *H02J 7/00*   (2006.01)
  *H02J 7/04*   (2006.01)

(52) U.S. Cl.
  CPC ........... *H02J 7/04* (2013.01); *B60L 2240/547* (2013.01); *B60L 2240/549* (2013.01); *H01M 2220/20* (2013.01); *H02J 2207/10* (2020.01)

(56) References Cited

OTHER PUBLICATIONS

Brslica et al., Co-generative power source for electric car, 2005, IEEE, p. 439-445 (Year: 2005).*
Ehsan et al., On board power management, 2004, IEEE, p. 11-17 (Year: 2004).*

* cited by examiner

BATTERY HEATER FAILURE DIAGNOSTIC DEVICE FOR VEHICLE

TECHNICAL FIELD

The present disclosure relates to a battery heater failure diagnostic device provided in a vehicle on which a motor as a drive source, a battery for supplying electric power to the motor, and a battery heater for increasing a temperature of the battery are mounted.

BACKGROUND ART

Conventionally, as disclosed in JP2021-97028A, on a vehicle on which a motor as a drive source and a battery for supplying electric power to the motor are mounted, a battery heater is mounted to increase a temperature of the battery in order to suppress a reduction in output of the battery. In addition, it has been examined to provide a device for diagnosing failure of the battery heater.

For example, in JP2021-97028A, a voltage range of the battery at the time when the battery heater is actuated normally is set based on consumed electric power by auxiliary devices, each of which differs from the battery heater and is actuated by receiving the electric power from the battery, and a possible voltage range of the battery, the failure of the battery heater is diagnosed based on whether a voltage of the battery falls within the above set range when the battery heater is actuated.

SUMMARY OF THE INVENTION

Problem to be Solved by the Invention

As described above, the device disclosed in JP2021-97028A diagnoses the failure of the battery heater based on the consumed electric power by the auxiliary devices. Thus, in order to diagnose the failure of the battery heater with a high degree of accuracy, an accurate value of the consumed electric power by each of the auxiliary devices is necessary. However, it is difficult to obtain such values. More specifically, a sensor is used to detect a current flowing through each of the auxiliary devices, or the like. Then, the consumed electric power by each of the auxiliary devices can be calculated based on the respective detection value. However, in a configuration in which amounts of the consumed electric power, each of which is calculated based on the respective sensor detection value, are summed, an error in a total value possibly becomes significant due to accumulation of the errors by the sensors. Therefore, there is room for improvement in the device disclosed in JP2021-97028A in a point of diagnosing the failure of the battery heater with the high degree of accuracy.

The present disclosure has been made in view of a circumstance as described above and therefore has a purpose of providing a battery heater failure diagnostic device for a vehicle capable of diagnosing failure of a battery heater with a high degree of accuracy.

Means for Solving the Problem

In order to solve the above problem, the present disclosure provides a battery heater failure diagnostic device provided in a vehicle on which a motor as a drive source, a battery for supplying electric power to the motor, a battery heater for increasing a temperature of the battery by receiving the electric power from the battery, and at least one non-heater device are mounted, the at least one non-heater device differing from the battery heater and being actuated by receiving the electric power from the battery. The battery heater failure diagnostic device includes a battery output sensor configured to detect a battery output value that is a current value or a voltage value of the battery and a controller that controls each part of the vehicle including the battery heater and the at least one non-heater device. In the battery heater failure diagnostic device, when a specified failure diagnosis condition is satisfied, the controller executes a first control to stop actuation of the battery heater and the at least one non-heater device and a second control to actuate the battery heater while maintaining the stop of the actuation of the at least one non-heater device after execution of the first control, and diagnoses a failure of the battery heater based on the battery output values that are detected by the battery output sensor during execution of the first control and during execution of the second control.

In the present disclosure, the battery heater is actuated and stopped in a state of stopping the actuation of the non-heater device(s) other than the battery heater among electrical devices that are actuated by receiving the electric power from the battery. Thus, it is possible to detect a change in an output value of the battery caused by the actuation of the battery heater only. Therefore, based on this detection value, it is possible to diagnose whether the battery heater has failed with a high degree of accuracy.

In the configuration, preferably, the battery has a plurality of battery modules, the battery heater has a plurality of heater bodies which are connected in series and each of which increases a temperature of the respective battery module, and a heater contactor that connects or disconnects a heater circuit including the plurality of heater bodies to or from the battery, and the controller stops the actuation of the battery heater by opening the heater contactor during execution of the first control, actuates the battery heater by closing the heater contactor during execution of the second control, and diagnoses the failure of the heater contactor based on a difference between the battery output values.

With this configuration, it is possible to switch actuation/stop of the heater by closing/opening the heater contactor and thus to simplify a configuration to switch the actuation/stop of the heater. In addition, it is possible to determine whether the temperature of the battery can be increased by the battery heater by diagnosing the failure of the heater contactor.

In this configuration, preferably, the vehicle includes a low-voltage battery, an output voltage of which is lower than the battery, the at least one non-heater device includes an AC external charger that has an AC/DC converter for converting an AC current to a DC current and charges the battery by using output power from an external AC power supply and a DC/DC converter that is actuated when the battery is charged by using the AC external charger and that reduces a voltage of output power of the AC/DC converter and supplies the output power to the low-voltage battery, and, when charging of the battery by using the AC external charger is terminated, the controller determines that the failure diagnosis condition is satisfied.

With this configuration, it is possible to diagnose the failure of the battery heater by using the timing to terminate charging of the battery by using the AC external charger. In addition, since the failure of the battery heater is diagnosed in a state where actuation of the DC/DC converter as one of the non-heater devices is stopped, it is possible to avoid an actuation situation of the DC/DC converter influencing the difference between the battery output values. Therefore, it is possible to diagnose the failure of the battery heater with the high degree of accuracy in the vehicle in which the DC/DC converter is provided and the DC/DC converter is actuated during charging of the battery.

In this configuration, preferably, the vehicle includes the low-voltage battery, the output voltage of which is lower than the battery, and a DC external charger that charges the battery by output power from an external DC power supply, the at least one non-heater device includes the DC/DC converter that is actuated when the battery is charged by using the DC external charger and that reduces a voltage of output power of the DC external charger and supplies the output power to the low-voltage battery, and, when charging of the battery by using the DC external charger is terminated, the controller determines that the failure diagnosis condition is satisfied.

With this configuration, it is possible to diagnose the failure of the battery heater by using the timing to terminate charging of the battery by using the DC external charger. In addition, similar to the time when charging of the battery by the AC external charger is terminated, it is possible to avoid the actuation situation of the DC/DC converter influencing the difference between the battery output values. Therefore, it is possible to diagnose the failure of the battery heater with the high degree of accuracy in the vehicle in which the DC/DC converter is provided and the DC/DC converter is actuated during charging of the battery.

In this configuration, preferably, the vehicle further includes a switch operated by an occupant and capable of switching between a start and a stop of the vehicle, the at least one non-heater device includes a positive temperature coefficient (PTC) heater for air conditioning and an electric compressor, and the controller determines that the failure diagnosis condition is satisfied when an operation to stop the vehicle is performed on the switch.

With this configuration, it is possible to diagnose the failure of the battery heater by using the timing to stop the vehicle. In addition, since the failure of the battery heater is diagnosed in a state where actuation of the PTC heater for air conditioning and the electric compressor as the non-heater devices is stopped, it is possible to avoid an actuation situation of these devices, consumed electric power of each of which is relatively high, from influencing the difference between the battery output values. Therefore, it is possible to diagnose the failure of the battery heater with the high degree of accuracy in the vehicle in which the PTC heater and the electric compressor are provided and these are actuated at a start of the vehicle.

In this configuration, preferably, the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

With this configuration, it is possible to reduce an opportunity of executing the second control for actuating the battery heater for the failure determination while accuracy of the failure determination of the battery heater is secured.

Advantage of the Invention

As it has been described so far, the battery heater failure diagnostic device for a vehicle according to the present disclosure can diagnose the failure of the battery heater with the high degree of accuracy.

MODES FOR CARRYING OUT THE INVENTION (1) Overall Configuration of Vehicle

Figure 1:
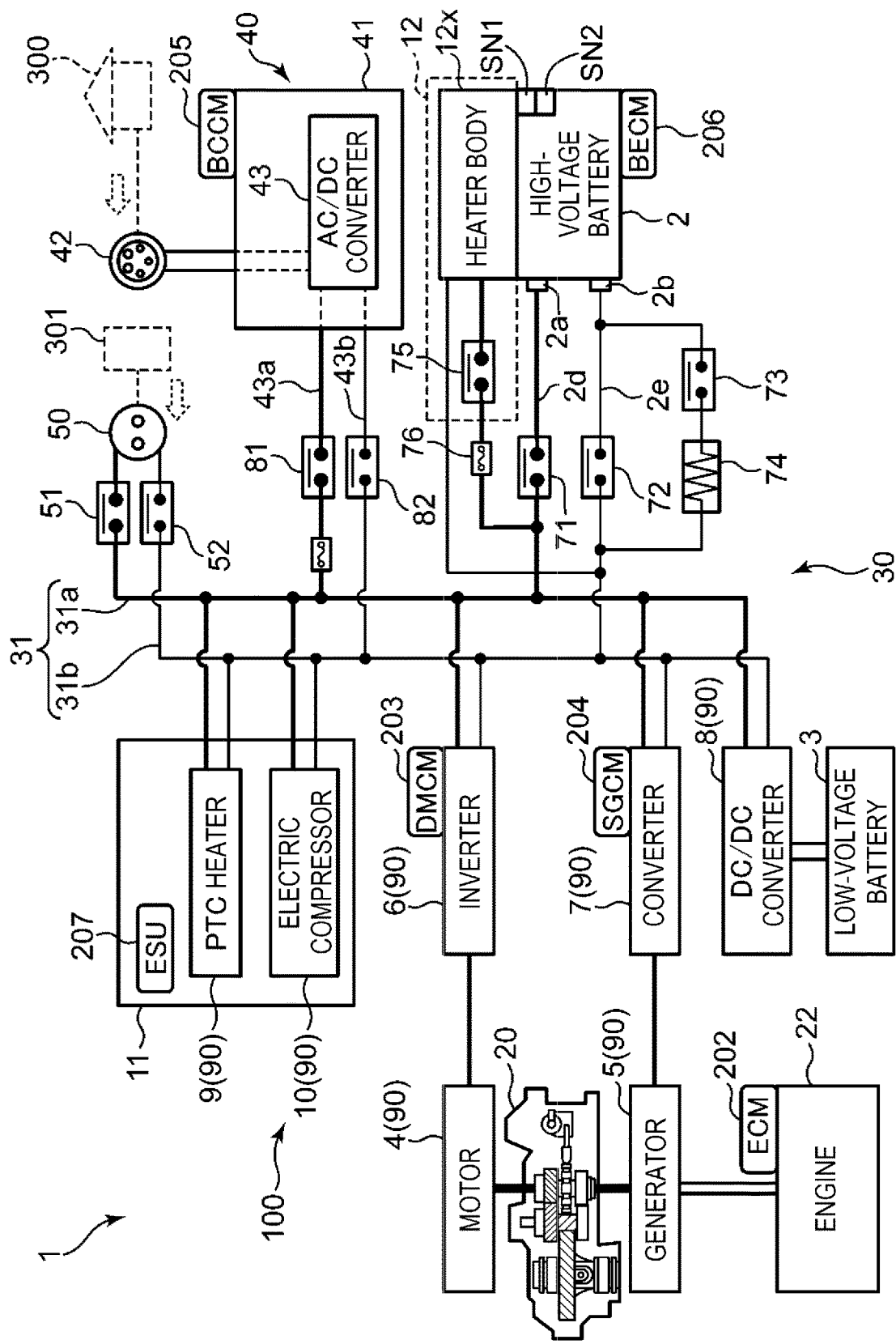
FIG. 1 is a view schematically illustrating a configuration of a vehicle on which a battery heater failure diagnostic device according to an embodiment of the present invention is mounted.

A description will be made on a battery heater failure diagnostic device for a vehicle according to an embodiment of the present disclosure. FIG. 1 is a view schematically illustrating a configuration of a vehicle 1 on which a battery heater failure diagnostic device 100 according to this embodiment is mounted. The vehicle 1 is a four-wheeled automobile, for example.

The vehicle 1 has a high-voltage battery 2, a low-voltage battery 3, an output voltage of which is lower than the high-voltage battery 2, an AC external charger 40, a DC external charger 50, and a plurality of high-voltage devices, each of which is actuated by receiving electric power from the high-voltage battery 2. The vehicle 1 also has a plurality of controllers, each of which includes a microprocessor and the like and controls a respective part of the vehicle 1. The high-voltage battery 2 is an example of a "battery" in the present disclosure.

On the vehicle 1, a battery heater 12 as one of the high-voltage devices is mounted to increase a temperature of the high-voltage battery 2. In addition, on the vehicle 1, non-heater devices 90 which are the high-voltage devices other than the battery heater 12 are mounted. The non-heater devices 90 include a motor 4, a generator 5, an inverter 6, a converter 7, a DC/DC converter 8, a positive temperature coefficient (PTC) heater 9, an electric compressor 10, and an AC/DC converter 43 included in the AC external charger 40.

(Battery and Battery Heater)

Figure 2:
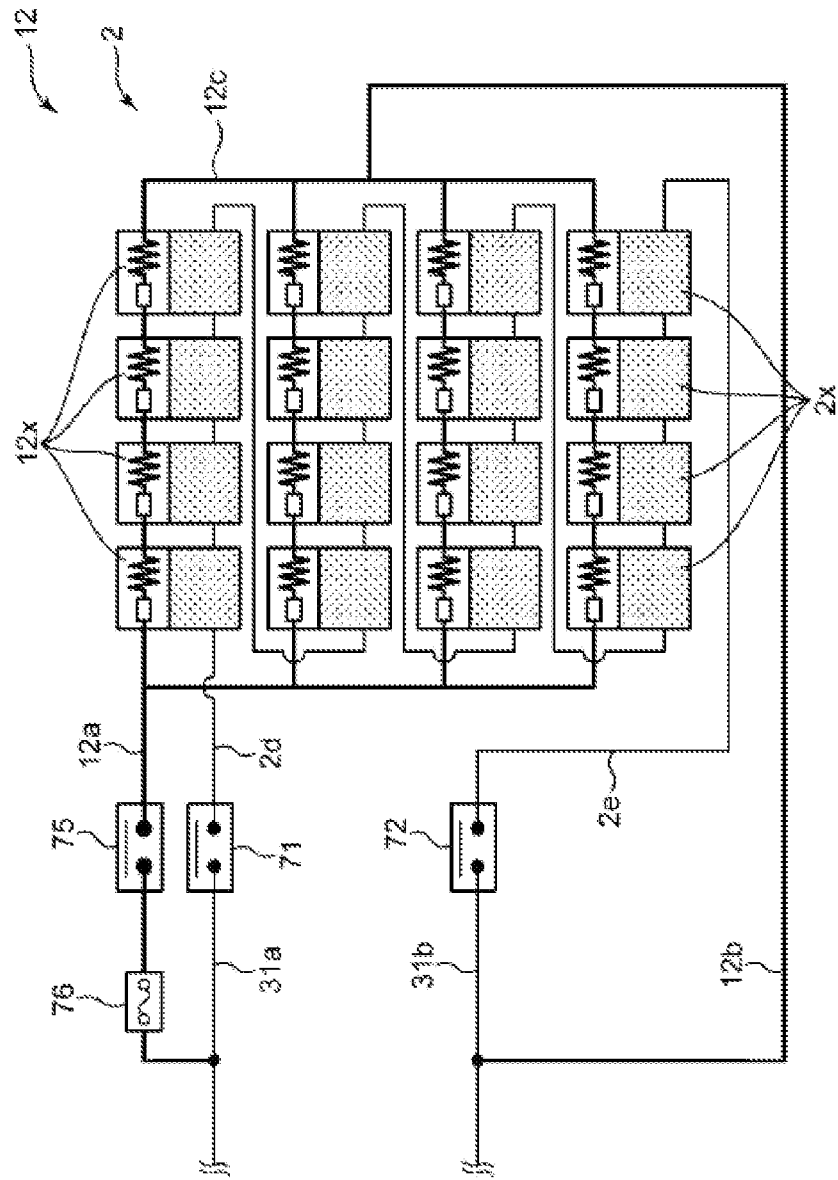
FIG. 2 is a view schematically illustrating configurations of a high-voltage battery and a battery heater.

FIG. 2 is a view schematically illustrating configurations of the high-voltage battery 2 and the battery heater 12. In this embodiment, a Li battery (a lithium battery) is mounted as the high-voltage battery 2 on the vehicle 1. For example, the high-voltage battery 2 is configured to have a plurality of (16 in an example illustrated in FIG. 2) battery modules 2x, each of which includes 12 battery cells, and which are connected in series. Six of the battery cells are connected in series in each set, and two sets of these six battery cells are connected in parallel. In addition, in this embodiment, a lead battery is mounted as the low-voltage battery 3 on the vehicle 1. For example, a nominal voltage of the high-voltage battery 2 is 24 V, and a nominal voltage of the low-voltage battery 3 is 12 V.

The high-voltage battery 2 is provided with a battery current sensor SN1 that detects an output current of the high-voltage battery 2 and a battery temperature sensor SN2 that detects a temperature of the high-voltage battery 2, in detail, a temperature of the specified battery module 2x. In this embodiment, the battery current sensor SN1 is an example of a "battery output sensor" in the present disclosure. In addition, the output current of the high-voltage battery 2, that is, a current value of the high-voltage battery 2 is an example of a "battery output value" in the present disclosure.

The battery heater 12 has a plurality of heater bodies 12x, each of which generates heat when being supplied with the electric power and a heater contactor 75 that makes/interrupts electrical connection between a heater circuit 12c including the heater bodies 12x and the high-voltage battery 2. The battery heater 12 has the same number (16 in the example illustrated in FIG. 2) of the heater bodies 12x as the battery modules 2x. Each of the heater bodies 12x is disposed in a contact state with the respective battery module 2x. The plurality of heater bodies 12x are connected in series and in parallel. More specifically, the plurality of heater bodies 12x are connected in series and are grouped. Then, these groups are connected in parallel. In the example illustrated in FIG. 2, 4 each of the 16 heater bodies 12x are connected in series, and 4 groups thereof are connected in parallel. In addition, in this embodiment, a fuse is connected to each of the heater bodies 12x in series. FIG. 2 illustrates a fuse 76.

The heater contactor 75 is a contactor, that is, an electromagnetic switch that includes an electromagnet, and makes/interrupts electrical connection between two contact points according to the supplied electric power. When the contactor is closed (turned ON), the two contact points are electrically connected and brought into an energized state. When the contactor is opened (turned OFF), the two contact points are electrically interrupted and brought into a non-energized state.

The only one heater contactor 75 is provided to one of two lines 12a, 12b (a line 12a on a positive electrode side and a line 12b on a negative electrode side) that connect the groups of the plural heater bodies 12x in parallel. In this way, in this embodiment, electrical connection between all the heater bodies 12x and the high-voltage battery 2 is made/interrupted by closing/opening the single heater contactor 75.

In detail, the two contact points of the heater contactor 75 are respectively connected to the line 12a on the positive electrode side and a P-side high-voltage line 31a, which will be described below and connected to a positive electrode terminal 2a of the high-voltage battery 2. The heater contactor 75 connects/disconnects the P-side high-voltage line 31a to/from the heater bodies 12x. Meanwhile, the line 12b on the negative electrode side is connected to an N-side high-voltage line 31b, which will be described below and connected to a negative electrode terminal 2b of the high-voltage battery 2 without a contactor being interposed therebetween.

(High-Voltage Circuit)

Of the high-voltage devices, the motor 4, the generator 5, the inverter 6, the converter 7, the DC/DC converter 8, the PTC heater 9, and the electric compressor 10 are provided on the same circuit. Hereinafter, the circuit provided with these will be referred to as a high-voltage circuit 30.

The high-voltage circuit 30 has the P-side high-voltage line 31a as the line on the positive electrode side that is connected to the positive electrode terminal 2a of the high-voltage battery 2 and the N-side high-voltage line 31b as the line on the negative electrode side that is connected to the negative electrode terminal 2b of the high-voltage battery 2. Hereinafter, the P-side high-voltage line 31a and the N-side high-voltage line 31b will appropriately and collectively be referred to as a high-voltage line 31.

The inverter 6, the converter 7, the DC/DC converter 8, the PTC heater 9, and the electric compressor 10 are each connected to the high-voltage line 31. The motor 4 is connected to the high-voltage line 31 via the inverter 6. The generator 5 is connected to the high-voltage line 31 via the converter 7.

The motor 4 rotates when being supplied with the electric power from the high-voltage battery 2. The motor 4 is mounted as a drive source of the vehicle 1 on the vehicle 1, and output of the motor 4 is transmitted to wheels (not illustrated) via a drive power transmission apparatus 20.

The generator 5 is a generating unit for charging the high-voltage battery 2. The vehicle 1 in this embodiment is a series-type hybrid vehicle, and an engine 22 that drives the generator 5 is mounted on the vehicle 1. That is, the generator 5 generates the electric power when being rotationally driven by the engine 22, and the electric power generated by the generator 5 is supplied to the high-voltage battery 2. The engine 22 is a rotary engine, for example. The generator 5 is also connected to the wheels via the drive power transmission apparatus 20, and the vehicle 1 can regenerate energy during deceleration.

The inverter 6 is a device that converts a DC current to an AC current, converts the DC current from the high-voltage battery 2 to the AC current, and supplies the AC current to the motor 4. The converter 7 is a device that converts the AC current to the DC current, converts the AC current, which is generated by the generator 5, to the DC current, and supplies the DC current to the high-voltage battery 2.

The DC/DC converter 8 is a device that increases or reduces input electric power for output, increases the output voltage of the high-voltage battery 2, and supplies the reduced voltage to the low-voltage battery 3. A microcomputer is mounted on the DC/DC converter 8, and this microcomputer executes control for actuating, stopping, and the like of the DC/DC converter 8.

The PTC heater 9 and the electric compressor 10 are devices for air conditioning and constitute an air conditioner 11 for the vehicle 1. More specifically, the PTC heater 9 is a device for heating inside of a cabin in the vehicle 1, and the electric compressor 10 is a device for cooling the inside of the cabin in the vehicle 1. In this embodiment, a cooling plate (not illustrated) for cooling the high-voltage battery 2 is provided, and the electric compressor 10 also cools this cooling plate.

The high-voltage circuit 30 and the high-voltage battery 2 are connected via contactors. More specifically, the vehicle 1 is provided with a P-side main contactor 71, two contact points of which are respectively connected to the positive electrode terminal 2a (in detail, a positive electrode side battery line 2d that is connected to the positive electrode terminal 2a) of the high-voltage battery 2 and the P-side high-voltage line 31a. The P-side main contactor 71 makes/interrupts the electrical connection between the positive electrode terminal 2a of the high-voltage battery 2 and the P-side high-voltage line 31a. In addition, the vehicle 1 is provided with an N-side main contactor 72, two contact points of which are respectively connected to the negative electrode terminal 2b (in detail, a negative electrode side battery line 2e that is connected to the negative electrode terminal 2b) of the high-voltage battery 2 and the N-side high-voltage line 31b. The N-side main contactor 72 makes/interrupts the electrical connection between the negative electrode terminal 2b of the high-voltage battery 2 and the N-side high-voltage line 31b.

In this embodiment, as the contactor, a pre-charge contactor 73 is also disposed in a parallel state with the N-side main contactor 72. The pre-charge contactor 73 also makes/interrupts the electrical connection between the negative electrode terminal 2b of the high-voltage battery 2 and the N-side high-voltage line 31b. Here, on a line provided with the pre-charge contactor 73, a resistor 74 is provided in series with the pre-charge contactor 73. Electrical resistance between the terminal of the high-voltage battery 2 and the high-voltage line 31 via the pre-charge contactor 73 is set to be higher than electrical resistance between the terminal of the high-voltage battery 2 and the high-voltage line 31 via the pre-charge contactor 73 and the N-side main contactor 72. Accordingly, in a state where both of the pre-charge contactor 73 and the N-side main contactor 72 are closed, electricity flows through the line on the N-side main contactor 72 side with the lower electrical resistance than the line on the pre-charge contactor 73 side. In FIG. 2, the pre-charge contactor 73, the resistor 74, and the line on which these are disposed are not illustrated.

(AC External Charger 40)

The AC external charger 40 is a device for supplying output power of an external AC power supply 300 to the high-voltage battery 2 so as to charge the high-voltage battery 2. The AC external charger 40 includes an on-board charger (OBC) 41 and an AC charging inlet 42.

The OBC 41 is a device for converting the AC current that is supplied from outside of the vehicle to a current that can appropriately be stored in the high-voltage battery 2. The OBC 41 has the AC/DC converter 43 as a device for converting the AC current to the DC current.

The AC charging inlet 42 is a device for electrically connecting the OBC 41 and a cable connected to the external AC power supply 300. The AC charging inlet 42 is configured to be electrically connected to the OBC 41, and is configured that a connector (hereinafter appropriately referred to as an AC connector) provided at an end of the cable is inserted therein and fitted thereto.

The OBC 41 is electrically connected to the high-voltage line 31 via a contactor, and the OBC 41 and the high-voltage battery 2 are electrically connected via the contactor and the high-voltage line 31.

More specifically, the vehicle 1 is provided with a P-side OBC contactor 81, two contact points of which are respectively connected to a line 43a on a positive electrode side of the OBC 41 and the P-side high-voltage line 31a. The P-side OBC contactor 81 makes/interrupts the electrical connection between the line 43a on the positive electrode side of the OBC 41 and the P-side high-voltage line 31a. In addition, the vehicle 1 is provided with an N-side OBC contactor 82, two contact points of which are respectively connected to a line 43b on a negative electrode side of the OBC 41 and the N-side high-voltage line 31b. The N-side OBC contactor 82 makes/interrupts the electrical connection between the line 43b on the negative electrode side of the OBC 41 and the N-side high-voltage line 31b.

(DC External Charger 50)

The DC external charger 50 is a device for supplying output power of an external DC power supply 301 to the high-voltage battery 2 so as to charge the high-voltage battery 2. The DC external charger 50 is electrically connected to the high-voltage battery 2 via contactors 51, 52 and the high-voltage line 31. The DC external charger 50 is configured that a connector (hereinafter appropriately referred to as an DC connector) provided at an end of a cable connected to the external DC power supply 301 is inserted therein and fitted thereto.

Here, when the AC connector is fitted to the AC charging inlet 42 in the AC external charger 40, the electric power can be supplied from the external power supply 300 to the AC external charger 40. Meanwhile, in regard to the DC external charger 50, the electric power cannot be supplied from the external power supply 301 to the DC external charger 50 unless the DC connector is fitted to the DC external charger 50 and then a switch provided to the external power supply 301 is turned ON.

In addition, in this embodiment, when the high-voltage battery 2 is charged by using the AC external charger 40 and the DC external charger 50, the low-voltage battery 3 is also charged in addition to the high-voltage battery 2. That is, when charging of the high-voltage battery 2 by each of the external chargers 40, 50 (hereinafter appropriately referred to as external charging) is executed, the DC/DC converter 8 is driven, a voltage of the electric power flowing through the high-voltage line 31 is then reduced by the DC/DC converter 8, and the current is supplied to the low-voltage battery 3.

(Controllers)

Figure 3:
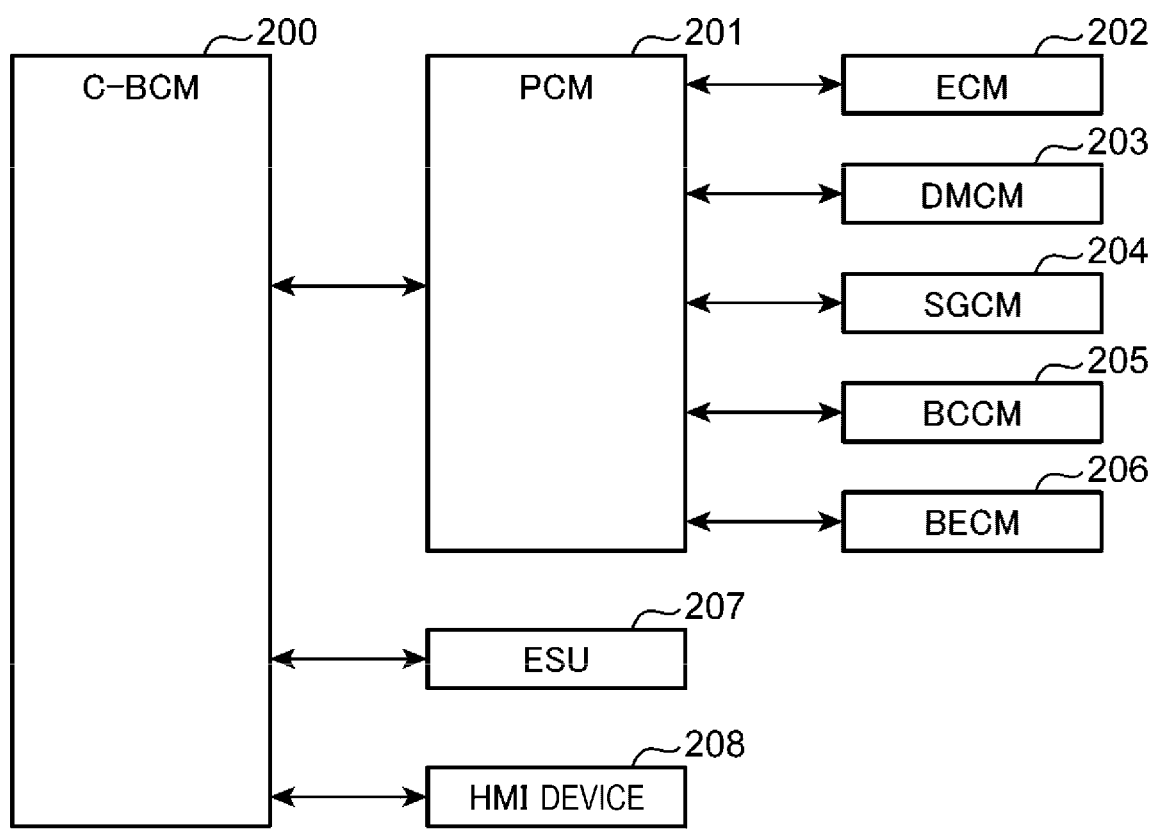
FIG. 3 is a block diagram illustrating relationships among various controllers.

FIG. 3 is a block diagram illustrating relationships among the various controllers mounted on the vehicle 1. The controllers include a center-body control module (C-BCM) 200, a power control module (PCM) 201, an engine control module (ECM) 202, a driver motor control module (DMCM) 203, a starter generator control module (SGCM) 204, a battery charger control module (BCCM) 205, a battery energy control module (BECM) 206, an electric supply unit (ESU) 207 are mounted. These controllers 200 to 207 are connected to the low-voltage battery 3, and are actuated when receiving the electric power from the low-voltage battery 3.

Each of the controllers 200 to 207 primarily executes the following control. The C-BCM 200 controls a door, a window, and the like. The PCM 201 controls devices in a drive system of the vehicle 1. The ECM 202 controls the engine 22. The DMCM 203 controls the inverter 6. The SGCM 204 controls the converter 7. The BCCM 205 controls the OBC 41. The BECM 206 controls the high-voltage battery 2. The ESU 207 controls the air conditioner 11. These controllers 200 to 207 mutually exchange signals. For example, these controllers 200 to 207 make controller area network (CAN) communication.

Here, a human-machine interface (HMI) device 208 illustrated in FIG. 3 is a device that shows various types of information, and the like, and includes a display and the like.

(Battery Heater Control)

Figure 4:
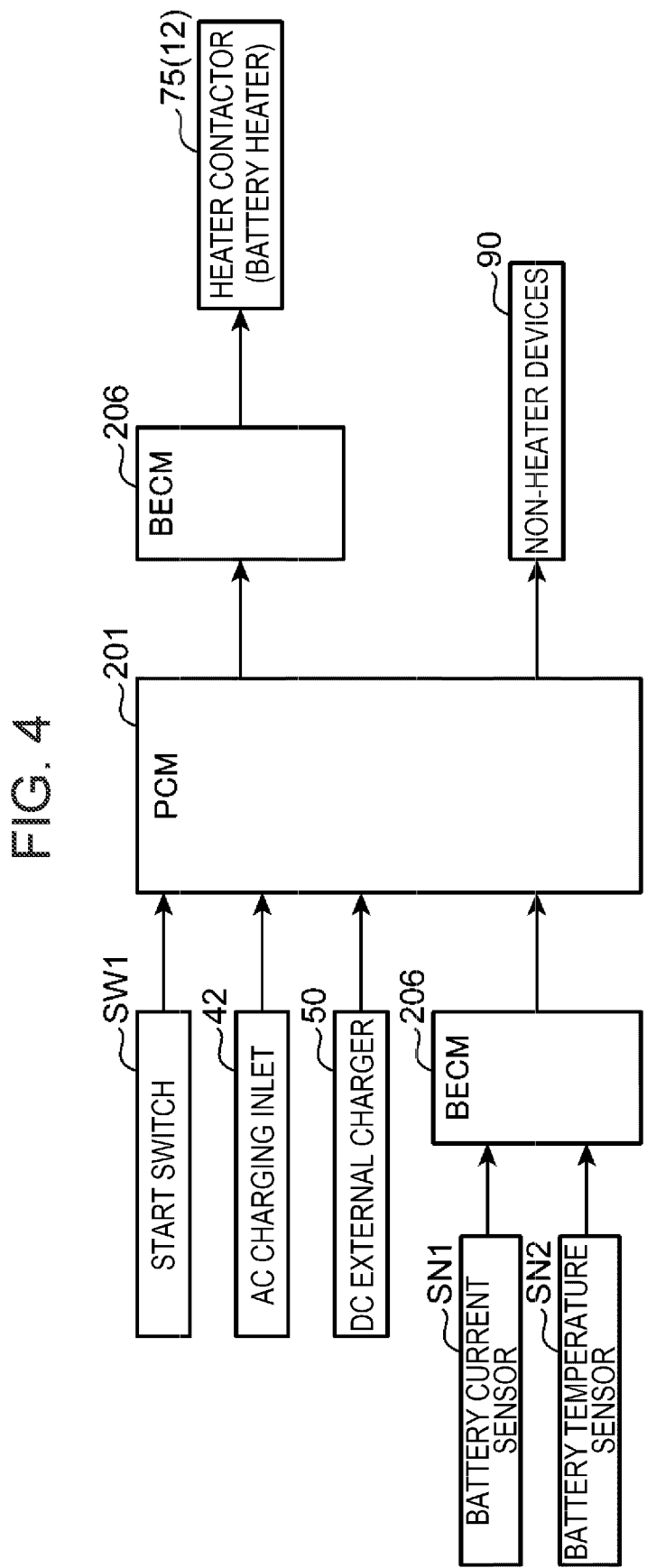
FIG. 4 is a block diagram illustrating a control system related to the battery heater.

FIG. 4 is a block diagram illustrating a control configuration related to the battery heater 12. The BECM 206 and the PCM 201 primarily control the battery heater 12, in detail, execute drive control for the battery heater 12 and diagnose failure of the battery heater 12. The BECM 206 and the PCM 201 each are examples of a "controller" in the present disclosure.

As illustrated in FIG. 4, the BECM 206 receives detection signals by the battery current sensor SN1 and the battery temperature sensor SN2. The PCM 201 also receives these detection signals via the BECM 206.

The vehicle 1 is provided with a start switch SW1 with which an occupant starts/stops the vehicle 1. An operation signal of this start switch SW1 is also input to the PCM 201. When the start switch SW1 is switched from OFF to ON, the PCM 201 determines that a start request of the vehicle 1 is made (the start request is made for the vehicle 1). Then, after a specified time elapses since the above switching is performed, the PCM 201 electrically connects the high-voltage battery 2 and the motor 4 and brings the motor 4 into a drivable state. Meanwhile, when the start switch SW1 is switched from ON to OFF and a specified time elapses since the switching, the PCM 201 interrupts the electrical connection between the high-voltage battery 2 and the motor 4.

The PCM 201 further receives signals from the AC charging inlet 42 and the DC external charger 50. The signals indicate connection states between each of these AC charging inlet 42 and the DC external charger 50 and respective one of the external power supplies 300, 301.

More specifically, when the AC connector is fitted to the AC charging inlet 42, the specified signal is transmitted from the AC charging inlet 42 to the PCM 201. Then, when the above fitting is canceled, the transmission of this signal is stopped. Hereinafter, this signal will be referred to as an AC charging start signal. A state where this signal is transmitted to the PCM 201 will be referred to as that the AC charging start signal is ON. A state where this signal is not transmitted to the PCM 201 will be referred to as that the AC charging start signal is OFF.

Meanwhile, when the DC connector is fitted to the DC external charger 50 and the switch provided to the external power supply 301 is operated to be ON, the specified signal is transmitted from the DC external charger 50 to the PCM 201. Then, when the above switch is operated to be OFF or the above fitting is canceled, the transmission of this signal is stopped. Hereinafter, this signal will be referred to as a DC charging start signal. A state where this signal is transmitted to the PCM 201 will be referred to as that the DC charging start signal is ON. A state where this signal is not transmitted to the PCM 201 will be referred to as that the DC charging start signal is OFF.

The PCM 201 executes various calculations and makes various determinations on the basis of each of the above signals, and issues a command to each of the devices in the vehicle 1. In regard to driving of the battery heater 12, the PCM 201 issues a command to the heater contactor 75 of the battery heater 12 via the BECM 206 so as to open/close this heater contactor 75. In addition, in regard to a failure diagnosis of the battery heater 12, the PCM 201 issues a command to the battery heater 12 (the heater contactor 75) via the BECM 206, and also issues commands to the non-heater devices 90. In detail, the PCM 201 issues a command to each of the controllers 202 to 207, and issues commands to the inverter 6, the converter 7, the PTC heater 9, the electric compressor 10, and the AC/DC converter 43, and further issues a command to the DC/DC converter 8. The BECM 206 makes a determination based on the signal from the battery temperature sensor SN2.

(Drive Control for Battery Heater)

Figure 5:
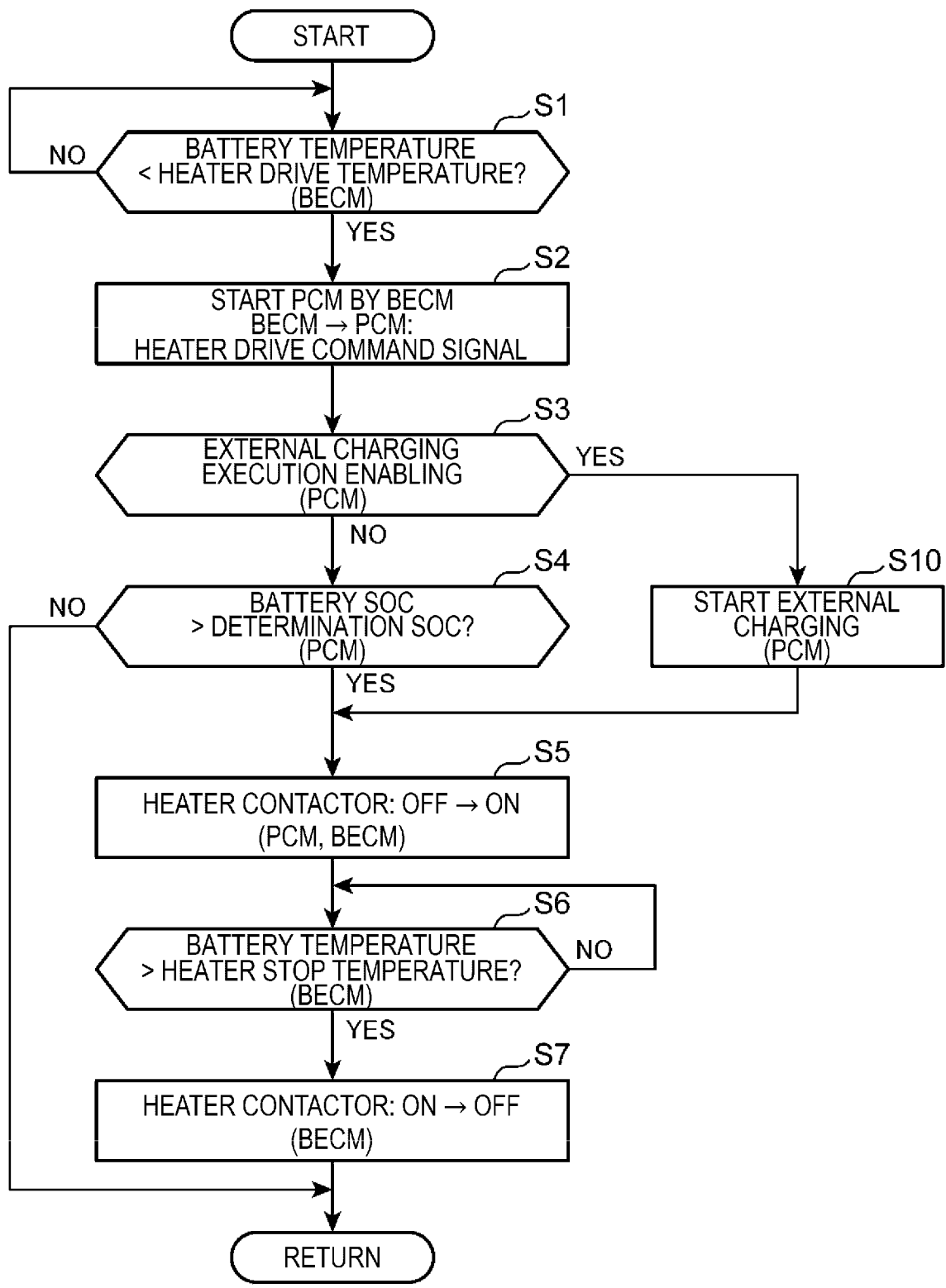
FIG. 5 is a flowchart illustrating a control flow at the time when the battery heater is actuated.

A description will be made on control that is executed by the BECM 206 and the PCM 201 to drive the battery heater 12 with reference to a flowchart in FIG. 5. In this embodiment, the battery heater 12 is driven during a stop of the vehicle, during which the start switch SW1 is OFF. Thus, step S1 in the flowchart illustrated in FIG. 5 is executed when the start switch SW1 is OFF. In addition, the flowchart in FIG. 5 is started in a state where the heater contactor 75 is opened (OFF) and driving of the battery heater 12 is stopped.

First, the BECM 206 determines whether the temperature of the high-voltage battery 2, which is detected by the battery temperature sensor SN2, is lower than a specified heater drive temperature (step S1). The heater drive temperature is set in advance and stored in the PCM 201. For example, the heater drive temperature is set at −10° C.

If the temperature of the high-voltage battery 2 is reduced to be lower than the heater drive temperature and thus it is determined YES in step S1, the BECM 206 starts the PCM 201 (step S2). More specifically, the electric power supply to the PCM 201 is stopped after a specified time elapses since switching of the start switch SW1 from ON to OFF. When the determination in step S1 becomes YES, the BECM 206 restarts the electric power supply to the PCM 201.

In addition to starting of the PCM 201, the BECM 206 issues a command signal for driving the battery heater 12 to the PCM 201 (step S2).

When receiving the above command signal from the BECM 206, the PCM 201 determines whether a current state is an external charging enabling state (step S3). More specifically, in the case where the AC charging start signal is ON or the DC charging start signal is ON, the PCM 201 determines that the current state is the external charging enabling state.

If the current state is the external charging enabling state and it is determined YES in step S3, the PCM 201 starts external charging (step S10). Here, as described above, in this embodiment, the low-voltage battery 3 is charged when external charging is executed. Accordingly, when step S10 is executed to start external charging, driving of the DC/DC converter 8 is also started, and thus the low-voltage battery 3 starts being charged. In addition, in the case where the AC charging start signal is ON and external charging is thus started in step S10, driving of the AC/DC converter 43 and the OBC 41 is also started.

After step S10, the processing proceeds to step S5. The PCM 201 switches the heater contactor 75 from the open state (OFF) to the closed state (ON) (step S5). More specifically, the PCM 201 issues the command to the BECM 206 to close the heater contactor 75. As a result, driving of the battery heater 12 is started.

More specifically, as described above, when the heater contactor 75 is turned ON, the battery heater 12 (the heater bodies 12x) and the high-voltage line 31 are brought into the energized state. In step S5, to which the processing proceeds after step S10, external charging is executed, and the electric power is supplied from the external power supply to the high-voltage line 31. In this way, in step S5, to which the processing proceeds after step S10, the electric power is supplied from the external power supply to the battery heater 12 (the heater bodies 12x), and the battery heater 12 (the heater bodies 12x) starts generating heat.

After step S5, the processing proceeds to step S6, and the BECM 206 determines whether the battery temperature has become higher than a specified heater stop temperature. Then, if the battery temperature is equal to or lower than the specified heater stop temperature (if it is determined NO in step S6), the BECM 206 maintains the ON state of the heater contactor 75. On the other hand, if the battery temperature has become higher than the specified heater stop temperature (if it is determined YES in step S6), the BECM 206 switches the heater contactor 75 from ON to OFF and stops driving the battery heater 12 (step S7). The heater stop temperature is set in advance and stored in the BECM 206. For example, the heater stop temperature is set at −5° C.

The description will return to step S3. If it is determined NO in step S3 and the current state is not the external charging enabling state, the PCM 201 determines a battery SOC that is a state of charge (SOC) of the high-voltage battery 2 is higher than a specified determination SOC (step S4). More specifically, the PCM 201 calculates the battery SOC on the basis of information on a battery voltage and a battery current sent from the BECM 206, and the like. Then, the PCM 201 compares this calculated value with the determination SOC. The determination SOC is set in advance and stored in the PCM 201. For example, the determination SOC is set about 35%.

If it is determined NO in step S4 and the battery SOC is equal to or lower than the determination SOC, the PCM 201 terminates the processing without driving the battery heater 12 (in a state where the heater contactor 75 is maintained to be OFF).

On the other hand, if it is determined YES in step S4 and the battery SOC is higher than the determination SOC, the processing proceeds to step S5. As described above, the PCM 201 turns on the heater contactor 75 and starts driving the battery heater 12 (the heater bodies 12x). After step S5, above steps S6, S7 are executed, and the processing is then terminated.

As described above, in this embodiment, in the case where external charging can be executed and the battery temperature is lower than the heater drive temperature, the battery heater 12 is driven, and external charging is executed regardless of a magnitude of the battery SOC. On the other hand, in the case where external charging cannot be executed, where the battery temperature is lower than the heater drive temperature, and where the battery SOC is higher than the determination SOC, the battery heater 12 is driven.

(Battery Heater Failure Determination)

Figure 6:
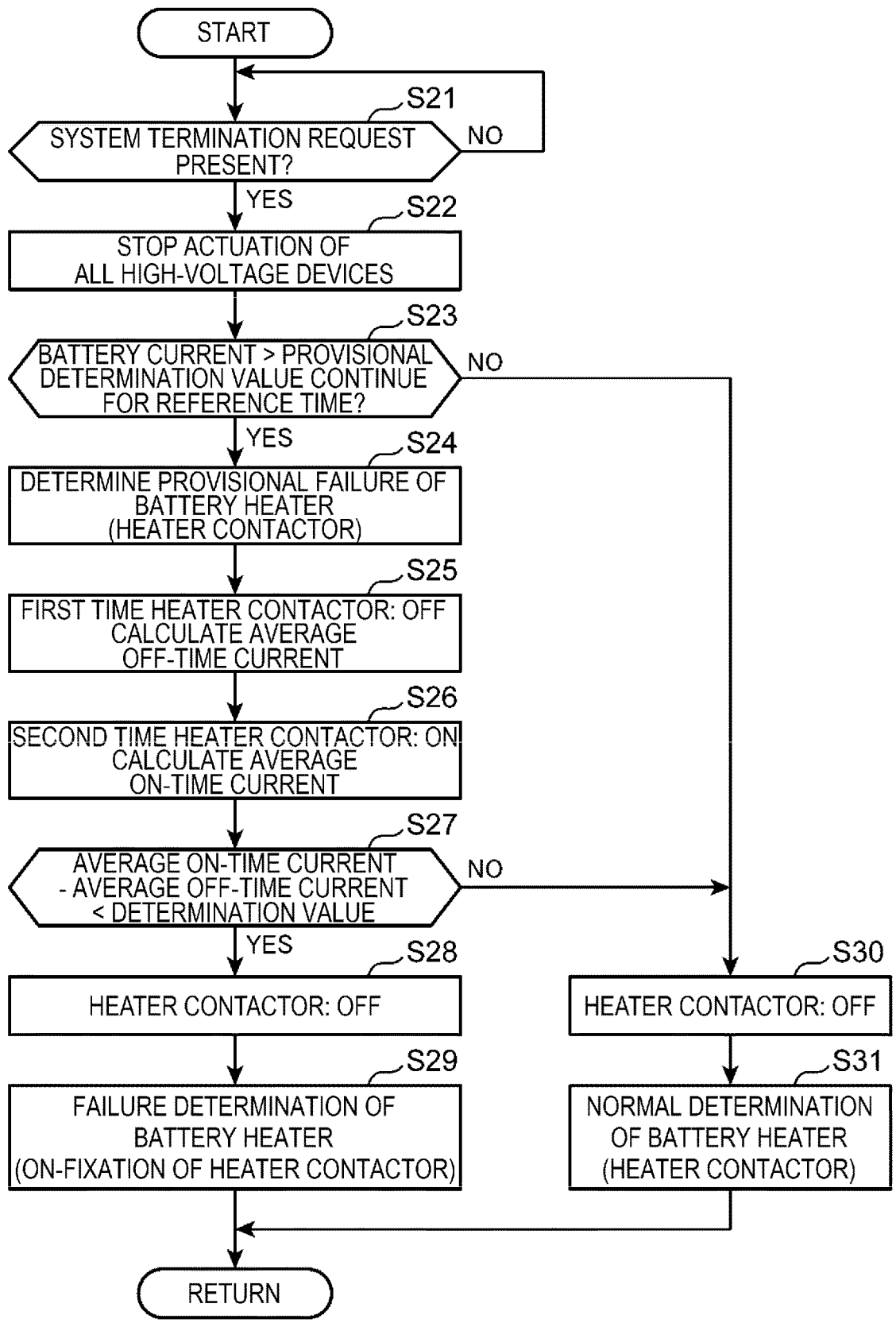
FIG. 6 is a flowchart illustrating a flow of a battery heater failure diagnosis.

A description will be made on a procedure for a failure determination of the battery heater 12 with reference to a flowchart illustrated in FIG. 6. The PCM 201 primarily makes the failure determination of the battery heater 12.

First, the PCM 201 determines whether a system termination request that is a request to terminate the system of the vehicle 1 has been made (step S21). Here, in this embodiment, a condition that the system termination request is made and a condition to start the failure determination of the battery heater 12 (a failure diagnosis condition) match each other. Thus, in step S21, it is determined whether the failure diagnosis condition has been met.

More specifically, in the case where the start switch SW1 is switched from ON to OFF and external charging is terminated, the PCM 201 determines that the system termination request has been made. Alternatively, in the case where the high-voltage battery 2 is fully charged, or the AC charging start signal or the DC charging start signal is switched from ON to OFF, the PCM 201 determines that external charging (charging of the high-voltage battery 2 by using the AC external charger 40 or charging of the high-voltage battery 2 by using the DC external charger 50) is terminated.

If the system termination request has been made and thus it is determined YES in step S21 (if it is determined that the failure diagnosis condition has been met), the PCM 201 stops the actuation of all the high-voltage devices (step S22). More specifically, the PCM 201 terminates the actuation of the battery heater 12 as well as the motor 4, the generator 5, the inverter 6, the converter 7, the DC/DC converter 8, the PTC heater 9, the electric compressor 10, and the AC/DC converter 43 as the non-heater devices 90. In the case where the actuation of the above non-heater devices 90 has already been stopped, the PCM 201 maintains stopped states thereof.

Next, the PCM 201 determines whether a state where the battery current as the output current of the high-voltage battery 2 is higher than a specified provisional determination value continues for a specified reference time after the actuation of all the high-voltage devices is stopped (after step S22 is executed) (step S23). More specifically, this determination is made on the basis of the detection value that is detected by the battery current sensor SN1 and is transmitted from the BECM 206. The provisional determination value is set in advance and stored in the PCM 201. The provisional determination value is set to a larger value than zero in advance on the basis of a minimum current of the output current of the high-voltage battery 2 and a detection error by the battery current sensor SN1 at the time when only the battery heater 12 is actuated by the high-voltage battery 2 (at the time when the electric power is supplied to the battery heater 12 only). Then, the provisional determination value is stored in the PCM 201. The reference time is also set in advance and stored in the PCM 201.

If it is determined NO in step S23, that is, in the case where the battery current immediately after the stop of the actuation of all the high-voltage devices is equal to or lower than the provisional determination value, or in the case where a state where the battery current on the charging side is higher than the provisional determination value does not continue for the reference time (for example, in the case where the battery current immediately after the stop of the actuation is higher than the provisional determination value, but the battery current is reduced to be equal to or lower than the provisional determination value before a lapse of the reference time), in step S30, the PCM 201 turns OFF the heater contactor 75 (maintains the heater contactor 75 to be OFF), determines that the battery heater 12 (the heater contactor 75) is normal (step S31), and then terminates the processing.

On the other hand, if it is determined YES in step S23, that is, in the case where the battery current continues to be higher than the provisional determination value in a period from the stop of the actuation of all the high-voltage devices to the lapse of the reference time, the PCM 201 provisionally determines that the battery heater 12 (the heater contactor 75) has failed (step S24).

Next, the PCM 201 maintains the heater contactor 75 to be OFF, that is, to be opened for a specified first time (step S25). In addition, the PCM 201 calculates an average value of the battery current during this first time and stores the average value as an average OFF-time current. More specifically, the PCM 201 issues a command to the BECM 206 to turn OFF the heater contactor 75, and calculates the average OFF-time current on the basis of the detection value that is detected by the battery current sensor SN1 and is transmitted from the BECM 206. The first time is set in advance and stored in the PCM 201. For example, the first time is set to one second.

Next, the PCM 201 maintains the heater contactor 75 to be ON, that is, to be closed for a specified second time (step S26). At this time, the PCM 201 turns ON the heater contactor 75 in the state of maintaining the stop of the actuation of the non-heater devices 90, and actuates only the battery heater 12 of the high-voltage devices. In addition, PCM 201 calculates an average value of the battery current during this second time and stores the average value as an average ON-time current. More specifically, the PCM 201 issues a command to the BECM 206 to switch the heater contactor 75 to be ON, and calculates the average ON-time current on the basis of the detection value that is detected by the battery current sensor SN1 and is transmitted from the BECM 206. The second time is set in advance and stored in the PCM 201. For example, the second time is set to the same time (one second or the like) as the first time.

Next, the PCM 201 determines whether a value obtained by subtracting the average OFF-time current from the average ON-time current, that is, an excess amount of the average ON-time current with respect to the average OFF-time current is smaller than a specified determination value (step S27). The determination value is set in advance and stored in the PCM 201. Similar to the provisional determination value, the determination value is set in advance on the basis of the minimum current of the output current of the high-voltage battery 2 and the detection error by the battery current sensor SN1 at the time when only the battery heater 12 is actuated. Then, the determination value is stored in the PCM 201.

If the above difference (excess amount) is smaller than the determination value and it is determined YES in step S27, the PCM 201 issues a command to turn OFF the heater contactor 75 thereto (step S28), determines that the battery heater 12 (the heater contactor 75) has failed (step S29), and then terminates the processing. In detail, the PCM 201 determines that the heater contactor 75 is fixed to be ON. In the case where the PCM 201 determines that the battery heater 12 (the heater contactor 75) has failed, the PCM 201 causes the HMI device 208 to provide a display for notifying of abnormality, or the like.

On the other hand, if the above difference (excess amount) is equal to or larger than the determination value and it is determined NO in step S27, the processing proceeds to step S30. Then, the PCM 201 issues the command to turn OFF the heater contactor 75 thereto, determines that the battery heater 12 (the heater contactor 75) is normal in step S31, and then terminates the processing.

Here, the above step S22 to stop the actuation of all the high-voltage devices and the above step S25 to turn off the heater contactor 75 so as to stop the actuation of the battery heater 12 each are examples of a "first control" in the present disclosure. The above step S26 to turn ON the heater contactor 75 thereafter is an example of a "second control" in the present disclosure. The above provisional determination value is an example of a "first determination value" in the present disclosure, and the above determination value is an example of a "second determination value" in the present disclosure.

Figure 7:
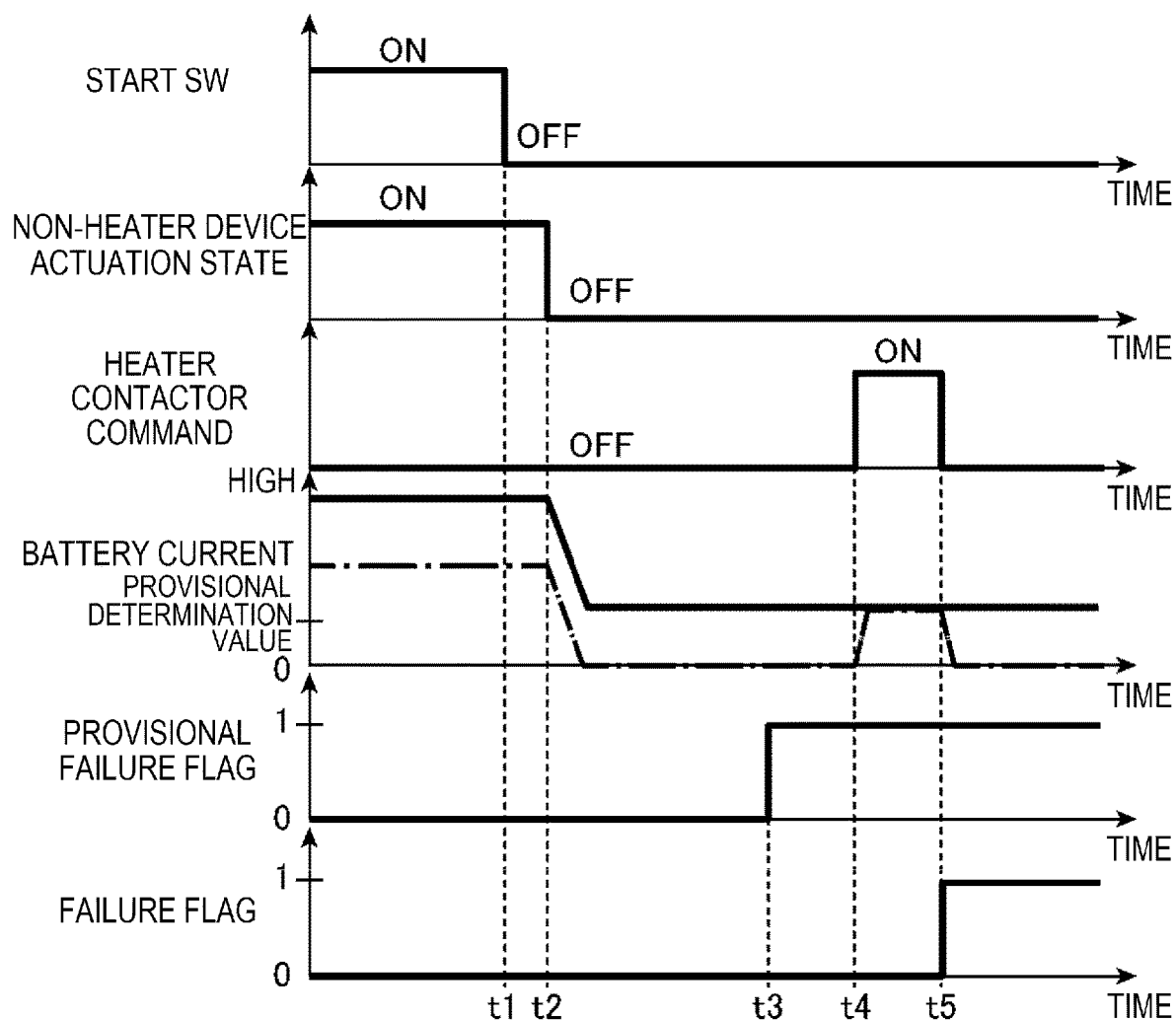
FIG. 7 is a time chart illustrating a temporal change in each parameter before and after a start switch is turned OFF.
Figure 8:
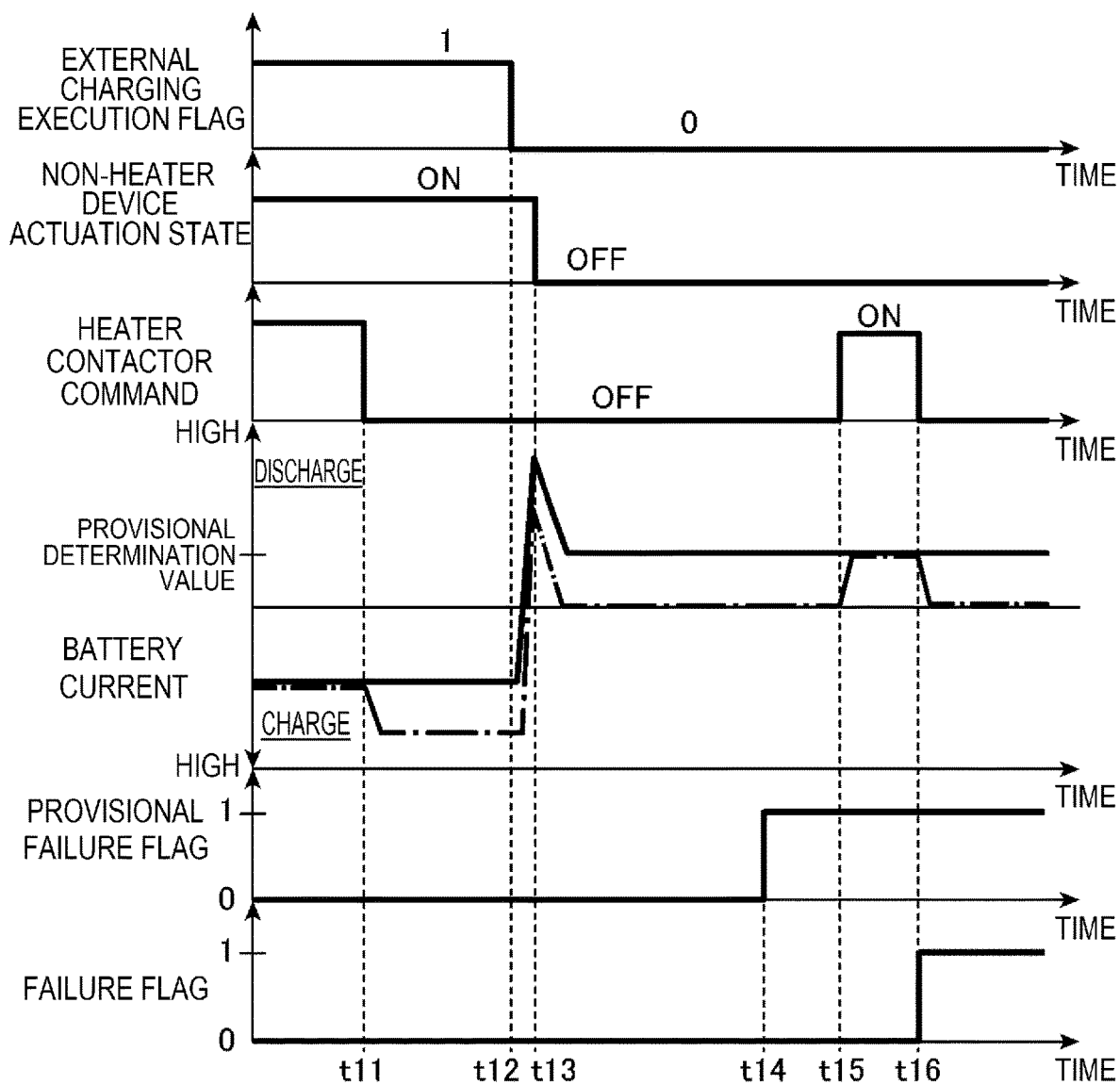
FIG. 8 is a time chart illustrating the temporal change in each of the parameters before and after external charging is terminated.

FIG. 7 and FIG. 8 show a temporal change in each parameter at the time when the above failure determination is made. FIG. 7 is a time chart in the case where the failure determination is made in conjunction with switching of the start switch SW1 from ON to OFF. FIG. 8 is a time chart in the case where the failure determination is made in conjunction with the termination of external charging. FIG. 7 sequentially illustrates, from top, graphs of an operation state of the start switch SW1, an actuation state of the non-heater device(s) 90, the opening/closing command to the heater contactor 75, the battery current (the output current of the high-voltage battery 2), a provisional failure flag, and a failure flag. The provisional failure flag is a flag that is set to 0 at the beginning of the failure determination and is set to 1 when the failure of the battery heater 12 (the heater contactor 75) is provisionally determined (when it is determined YES in above step S24). The failure flag is a flag that is set to 0 at the beginning of the failure determination and is set to 1 when the failure of the battery heater 12 (the heater contactor 75) is determined (when it is determined YES in above step S27). FIG. 8 sequentially illustrates, from top, graphs of an external charging execution flag, the actuation state of the non-heater device(s) 90, the opening/closing command to the heater contactor 75, the battery current, the provisional failure flag, and the failure flag. The external charging execution flag is a flag that is set to 0 at the beginning of external charging and is set to 1 when external charging is terminated. In the graphs of the battery current in FIG. 7 and FIG. 8, a solid line indicates the battery current at the time when the battery heater 12 fails, and a chain line indicates the battery current at the time when the battery heater 12 does not fail.

In the example illustrated in FIG. 7, at time t1, the start switch SW1 is switched from ON to OFF. When the start switch SW1 is switched from ON to OFF at time t1, as described above, the PCM 201 determines that the system termination request has been made. In response thereto, at time t2, the actuation of all the high-voltage devices is stopped. After time t2, the battery current is reduced.

Here, in the case where the battery heater 12 does not fail, that is, in the case where the heater contactor 75 is normally turned OFF (in the open state), the electric power is no longer supplied from the high-voltage battery 2 to the battery heater 12. Accordingly, as indicated by the chain line, after time t2, the battery current is reduced to near zero.

On the other hand, in the case where the battery heater 12 fails, that is, in the case where the heater contactor 75 is fixed to be ON (fails in the closed state), the electric power is supplied from the high-voltage battery 2 to the heater contactor 75. For this reason, in this case, as indicated by the solid line, after time t2, the battery current is not reduced to zero and exhibits a higher value than the provisional determination value.

In addition, in the case where the battery heater 12 fails, as indicated by the solid line, even after the battery current is reduced after time t2, the battery current is maintained to the higher value than the provisional determination value. Accordingly, in the case where the battery heater 12 fails, the state where the battery current is higher than the provisional determination value continues for the reference time from the stop of the actuation of all the high-voltage devices. Then, at time t3 at which the reference time elapses from time t2, it is provisionally determined that the battery heater 12 (the heater contactor 75) has failed (the provisional failure flag is switched from 0 to 1).

When the failure of the battery heater 12 is provisionally determined, as indicated by a solid line, the PCM 201 issues the command to turn OFF the heater contactor 75 in a period from time t3 to time t4 at which the first time elapses from time t3. Then, the PCM 201 issues the command to turn ON the heater contactor 75 in a period from time t4 to time t5 at which the second time elapses from time t4. At time t5, the command to switch the heater contactor 75 to be OFF is issued again. Just as described, the ON/OFF commands from the PCM 201 are switched. However, in the case where the battery heater 12 fails, as indicated by the solid line, the battery current does not fluctuate. Accordingly, the difference between the average OFF-time current, which is the average value of the battery current from time t3 to time t4, and the average ON-time current, which is the average value of the battery current from time t4 to time t5, is substantially zero and is a smaller value than the determination value. As a result, after time t5, it is determined that the battery heater 12 has failed (the failure flag is switched from 0 to 1).

Meanwhile, as indicated by the chain line, in the case where the battery heater 12 does not fail, the current supply from the high-voltage battery 2 to the battery heater 12 (the heater bodies 12x) is started when the command to turn ON the heater contactor 75 is issued at time t4. Consequently, the battery current is increased, and the excess amount of the ON-time battery current with respect to the OFF-time battery current becomes equal to or larger than the determination value. Thereafter, at the time t5, when the command to turn OFF the heater contactor 75 is issued, the above electric power supply is stopped, and the battery current is reduced to near zero.

In the example illustrated in FIG. 8, external charging is executed until time t12 (at time t12, the external charging execution flag is switched from 1 to 0). Thus, until time t12, the electric power is supplied to the high-voltage battery 2 from the outside. In the example illustrated in FIG. 8, the battery heater 12 is driven while external charging is executed. For this reason, until time t11 at which the battery temperature becomes higher than the heater stop temperature, the command to the heater contactor 75 remains ON. Then, at time t11, this command is turned OFF.

After external charging is terminated at time t12, the electric power is supplied from the high-voltage battery 2 to the high-voltage devices, and thus the output current from the high-voltage battery 2 (the current on the discharge side) is increased. However, when external charging is terminated at time t12, as described above, the PCM 201 determines that the system termination request has been made. In response thereto, at time t13, the actuation of all the high-voltage devices is stopped. Consequently, after time t13, the battery current is reduced.

Here, in the case where the battery heater 12 does not fail, that is, in the case where the heater contactor 75 is not fixed to be ON, at time t11, the heater contactor 75 is turned OFF, and the actuation of the battery heater 12 is stopped. In conjunction therewith, as indicated by the chain line in FIG. 8, the battery current (the current on the charging side) is increased. In addition, in the case where the battery heater 12 does not fail, after time t13, the electric power supply from the high-voltage battery 2 to all the high-voltage devices including the battery heater 12 is stopped. As a result, as indicated by the chain line, after time t13, the battery current is reduced to near zero.

On the other hand, in the case where the battery heater 12 fails, the electric power supply from the high-voltage battery 2 to the battery heater 12 continues after time t11. Thus, as indicated by the solid line, the battery current is not changed before and after time t11. In addition, in this case, the electric power supply from the high-voltage battery 2 to the battery heater 12 is maintained after time t13. Thus, as indicated by the solid line, the battery current is not reduced to zero and exhibits the higher value than the provisional determination value. Then, after time t13, the battery current is maintained to be the higher value than the provisional determination value. Accordingly, the state where the battery current is higher than the provisional determination value continues for the reference time from the stop of the actuation of all the high-voltage devices. Then, at time t14 at which the reference time elapses from time t13, it is provisionally determined that the battery heater 12 (the heater contactor 75) has failed (the provisional failure flag is switched from 0 to 1).

When the failure of the battery heater 12 is provisionally determined, as indicated by the solid line, the PCM 201 issues the command to turn OFF the heater contactor 75 in a period from time t14 to time t15 at which the first time elapses from time t14. Then, the PCM 201 issues the command to turn ON the heater contactor 75 in a period from time t15 to time t16 at which the second time elapses from time t15. At time t16, the command to switch the heater contactor 75 to be OFF is issued again. Just as described, the ON/OFF commands from the PCM 201 are switched. However, in the case where the battery heater 12 fails, as indicated by the solid line, the battery current does not fluctuate. Accordingly, the difference between the average OFF-time current, which is the average value of the battery current from time t14 to time t15, and the average ON-time current, which is the average value of the battery current from time t15 to time t16, is substantially zero and is a smaller value than the determination value. As a result, after time t16, it is determined that the battery heater 12 has failed (the failure flag is switched from 0 to 1).

(Operational Effects and the Like)

As it has been described so far, in this embodiment, when the system termination request is made, that is, when the failure diagnosis condition is satisfied, the actuation of both of the battery heater 12 and the non-heater devices 90, that is, all the high-voltage devices, each of which is supplied with the electric power from the high-voltage battery 2, is stopped (steps S22, S25). Thereafter, the heater contactor 75 is turned ON, and only the battery heater 12 is actuated (step S26). Therefore, it is possible to reliably detect a change amount of the battery current caused by the actuation of the battery heater 12 only. In addition, based on this change amount, it is possible to determine whether the battery heater 12 has failed with a high degree of accuracy.

In particular, in the above embodiment, when external charging is terminated, it is determined that the system termination request has been made (the failure diagnosis condition has been met), and the failure determination of the battery heater 12 is made. Therefore, it is possible to further reliably detect the failure of the battery heater 12 (in detail, the ON fixation of the heater contactor 75).

More specifically, the heater contactor 75 is likely to be fixed after being switched from OFF to ON. In the above embodiment, in the case where external charging is started (in the case where it is determined YES in step S3), the heater contactor 75 is switched from OFF to ON regardless of whether the battery SOC is high (without executing step S4). For this reason, when external charging is executed, the heater contactor 75 is switched from OFF to ON at a relatively high frequency, and thus a probability that the heater contactor 75 is fixed to be ON is increased. Therefore, it is possible to further reliably detect the ON fixation of the heater contactor 75 by making the failure determination of the battery heater 12 after the termination of external charging.

In the above embodiment, it is configured that, when external charging is started, the DC/DC converter 8 is actuated, and the low-voltage battery 3 is charged in addition to the high-voltage battery 2. Therefore, it is possible to effectively improve failure determination accuracy of the battery heater 12 by stopping the actuation of the non-heater devices 90 including the DC/DC converter 8 during the failure determination of the battery heater 12 after the termination of external charging.

More specifically, in the case where the DC/DC converter 8 remains being actuated after the termination of external charging, the electric power is supplied from the high-voltage battery 2 to the low-voltage battery 3 via the DC/DC converter 8. The electric power supplied from the high-voltage battery 2 to the low-voltage battery 3 fluctuates in a relatively significant manner according to a SOC or the like of the low-voltage battery 3. Accordingly, in the case where the DC/DC converter 8 remains being actuated after the termination of external charging, the battery current fluctuates significantly, which makes it particularly difficult to calculate the change amount of the battery current generated due to the actuation of the battery heater 12 only. Meanwhile, in the above embodiment, the actuation of the DC/DC converter 8 is stopped after external charging is terminated. Therefore, it is possible to calculate the change amount of the battery current, which is generated due to the actuation of the battery heater 12 only, with the high degree of accuracy and thus to improve the failure determination accuracy of the battery heater 12.

In the above embodiment, when the start switch SW1 is switched from ON to OFF, it is determined that the system termination request has been made (the failure diagnosis condition is satisfied). Therefore, by using timing to switch the start switch SW1 to OFF, it is possible to make the failure determination of the battery heater 12 and to secure an opportunity for the failure determination of the battery heater 12.

Here, consumed electric power of each of the PTC heater 9 and the electric compressor 10 is relatively high. Accordingly, in the case where the battery heater 12 is actuated in an actuation state of these, it is particularly difficult to calculate the change amount of the battery current generated due to the actuation of the battery heater 12 only. Meanwhile, in the above embodiment, the actuation of the PTC heater 9 and the electric compressor 10 is stopped when the start switch SW1 is switched from ON to OFF. Therefore, it is possible to calculate the change amount of the battery current, which is generated due to the actuation of the battery heater 12 only, with the high degree of accuracy and thus to improve the failure determination accuracy of the battery heater 12.

In the above embodiment, after the system termination request is made and the command to stop the actuation of all the high-voltage devices is issued (after step S22), it is determined whether the state where the battery current is higher than the provisional determination value continues for the specified reference time. Then, if such a state continues for the specified reference time (if it is determined YES in step S23), it is provisionally determined that the battery heater 12 (the heater contactor 75) has failed (step S24). Then, only when this provisional determination is made, the heater contactor 75 is thereafter switched from OFF to ON (step S26). In addition, it is determined whether the difference between the average ON-time current and the average OFF-time current is smaller than the determination value (step S27). If it is determined YES herein, it is determined that the battery heater 12 has failed (step S29).

Therefore, while the failure of the battery heater 12 can be determined with the high degree of accuracy, it is possible to reduce an opportunity of actuating the battery heater 12 by switching the heater contactor 75 from OFF to ON for the failure determination.

More specifically, in the case where the heater contactor 75 is fixed to be ON, the current flows from the high-voltage battery 2 into the battery heater 12 even after the system termination request is made and the command to stop the actuation of all the high-voltage devices including the battery heater 12 is issued (after step S22). As a result, the battery current becomes higher than the provisional determination value, which is higher than zero. Here, even in the case where the battery heater 12 does not fail, the battery current recognized by the PCM 201 may be increased momentarily when noise is added to the signal of the battery current sensor SN1. Meanwhile, in the above embodiment, the heater contactor 75 is switched from OFF to ON only in the case where the state where the battery current is higher than the provisional determination value continues for the specified reference time and there is an absolute possibility that the heater contactor 75 is fixed to be ON. Thus, it is possible to avoid switching of the heater contactor 75 to ON/OFF regardless of whether the heater contactor 75 fails.

In addition, the battery current is also increased when the high-voltage device other than the battery heater 12 fails. For this reason, when the failure of the battery heater 12 is determined only on the basis of the fact that the state where the battery current is higher than the provisional determination value continues for the reference time, an erroneous determination is possibly made. Meanwhile, in the above embodiment, the failure of the battery heater 12 is determined in the case where it is determined that the state where the battery current is higher than the provisional determination value continues for the reference time, and where the difference between the average ON-time current and the average OFF-time current is smaller than the determination value. Therefore, it is possible to determine the failure of the battery heater 12 with the high degree of accuracy.

In this embodiment, the electrical connection between the plurality of heater bodies 12$x$ and the high-voltage battery 2 is made/interrupted by the single heater contactor 75. Thus, the actuation/stop of the battery heater 12 can be switched by only closing/opening this heater contactor 75. Therefore, it is possible to simplify the configuration for switching. In addition, by determining the failure of this single heater contactor 75, it is possible to determine whether the temperature of the high-voltage battery 2 can be increased by the battery heater 12. Therefore, it is also possible to simplify the configuration for the failure determination.

Modified Embodiments

In the above embodiment, the description has been made on the case where the battery current as the output current of the high-voltage battery 2 is used as the battery output value that is used for the failure determination of the battery heater 12. However, instead of the output current of the high-voltage battery 2, a voltage value as the output voltage of the high-voltage battery 2 may be used. More specifically, instead of the configuration to determine whether the battery current is higher than the specified provisional determination value in step S23, it may be determined whether the output voltage of the high-voltage battery 2 is higher than a specified provisional determination value in step S23. In addition, it may be configured that an average value of the output voltage of the high-voltage battery 2 during the first time is calculated in step S25, an average value of the output voltage of the high-voltage battery 2 during the second time is calculated in step S26, and it is determined in step S27 whether a difference therebetween (a value obtained by subtracting the average value of the output voltage during the second time from the average value of the output voltage during the first time) is smaller than a specified determination value.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 High-voltage battery (battery)
2x Battery module
3 Low-voltage battery
4 Motor
8 DC/DC converter
9 PTC heater
10 Electric compressor
12 Battery heater
12c Heater circuit
12x Heater body
40 AC external charger
50 DC external charger
75 Heater contactor
90 Non-heater device
201 PCM (controller)
206 BECM (controller)
SN1 Battery current sensor (battery output sensor)
SW1 Start switch (switch)

The invention claimed is:

1. A battery heater failure diagnostic device provided in a vehicle on which a motor as a drive source, a battery for supplying electric power to the motor, a battery heater for increasing a temperature of the battery by receiving the electric power from the battery, and at least one non-heater device are mounted, the at least one non-heater device differing from the battery heater and being actuated by receiving the electric power from the battery, the battery heater failure diagnostic device for a vehicle comprising:
a battery output sensor configured to detect a battery output value that is a current value or a voltage value of the battery; and
a controller that controls each part of the vehicle including the battery heater and the at least one non-heater device, wherein
when a specified failure diagnosis condition is satisfied, the controller executes a first control to stop actuation of the battery heater and the at least one non-heater device and a second control to actuate the battery heater while maintaining the stop of the actuation of the at least one non-heater device after execution of the first control, and diagnoses a failure of the battery heater based on the battery output values that are detected by the battery output sensor during execution of the first control and during execution of the second control.

2. The battery heater failure diagnostic device for a vehicle according to claim 1, wherein
the battery has a plurality of battery modules,
the battery heater includes:
a plurality of heater bodies which are connected in series and each of which increases a temperature of the respective battery module; and
a heater contactor that connects or disconnects a heater circuit including the plural heater bodies to or from the battery, and
the controller stops the actuation of the battery heater by opening the heater contactor during execution of the first control, actuates the battery heater by closing the heater contactor during execution of the second control, and diagnoses failure of the heater based on a difference between the battery output values.

3. The battery heater failure diagnostic device for a vehicle according to claim 2, wherein
the vehicle includes a low-voltage battery, an output voltage of which is lower than the battery; and
the at least one non-heater device includes:
an AC external charger that has an AC/DC converter for converting an AC current to a DC current and charges the battery by using output power from an external AC power supply; and
a DC/DC converter that is actuated when the battery is charged by using the AC external charger and that reduces a voltage of output power of the AC/DC converter and supplies the output power to the low-voltage battery, and
when charging of the battery by using the AC external charger is terminated, the controller determines that the failure diagnosis condition is satisfied.

4. The battery heater failure diagnostic device for a vehicle according to claim 3, wherein
the vehicle includes the low-voltage battery, the output voltage of which is lower than the battery and a DC external charger that charges the battery by output power from an external DC power supply,
the at least one non-heater device includes the DC/DC converter that is actuated when the battery is charged by using the DC external charger and that reduces a voltage of output power of the DC external charger and supplies the output power to the low-voltage battery, and
when charging of the battery by using the DC external charger is terminated, the controller determines that the failure diagnosis condition is satisfied.

5. The battery heater failure diagnostic device for a vehicle according to claim 4, wherein
the vehicle further includes a switch operated by an occupant and capable of switching between a start and a stop of the vehicle,
the at least one non-heater device includes a positive temperature coefficient (PTC) heater for air conditioning and an electric compressor, and
the controller determines that the failure diagnosis condition is satisfied when an operation to stop the vehicle is performed on the switch.

6. The battery heater failure diagnostic device for a vehicle according to claim 5, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

7. The battery heater failure diagnostic device for a vehicle according to claim 1, wherein
the vehicle includes a low-voltage battery, an output voltage of which is lower than the battery; and
the at least one non-heater device includes:
an AC external charger that has an AC/DC converter for converting an AC current to a DC current and charges the battery by using output power from an external AC power supply; and
a DC/DC converter that is actuated when the battery is charged by using the AC external charger and that reduces a voltage of output power of the AC/DC converter and supplies the output power to the low-voltage battery, and
when charging of the battery by using the AC external charger is terminated, the controller determines that the failure diagnosis condition is satisfied.

8. The battery heater failure diagnostic device for a vehicle according to claim 1, wherein
the vehicle includes the low-voltage battery, the output voltage of which is lower than the battery and a DC external charger that charges the battery by output power from an external DC power supply,
the at least one non-heater device includes the DC/DC converter that is actuated when the battery is charged by using the DC external charger and that reduces a voltage of output power of the DC external charger and supplies the output power to the low-voltage battery, and
when charging of the battery by using the DC external charger is terminated, the controller determines that the failure diagnosis condition is satisfied.

9. The battery heater failure diagnostic device for a vehicle according to claim 1, wherein
the vehicle further includes a switch operated by an occupant and capable of switching between a start and a stop of the vehicle,
the at least one non-heater device includes a positive temperature coefficient (PTC) heater for air conditioning and an electric compressor, and
the controller determines that the failure diagnosis condition is satisfied when an operation to stop the vehicle is performed on the switch.

10. The battery heater failure diagnostic device for a vehicle according to claim 1, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

11. The battery heater failure diagnostic device for a vehicle according to claim 2, wherein
the vehicle includes the low-voltage battery, the output voltage of which is lower than the battery and a DC external charger that charges the battery by output power from an external DC power supply,
the at least one non-heater device includes the DC/DC converter that is actuated when the battery is charged by using the DC external charger and that reduces a voltage of output power of the DC external charger and supplies the output power to the low-voltage battery, and
when charging of the battery by using the DC external charger is terminated, the controller determines that the failure diagnosis condition is satisfied.

12. The battery heater failure diagnostic device for a vehicle according to claim 2, wherein
the vehicle further includes a switch operated by an occupant and capable of switching between a start and a stop of the vehicle,
the at least one non-heater device includes a positive temperature coefficient (PTC) heater for air conditioning and an electric compressor, and
the controller determines that the failure diagnosis condition is satisfied when an operation to stop the vehicle is performed on the switch.

13. The battery heater failure diagnostic device for a vehicle according to claim 2, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

14. The battery heater failure diagnostic device for a vehicle according to claim 7, wherein
the vehicle includes the low-voltage battery, the output voltage of which is lower than the battery and a DC external charger that charges the battery by output power from an external DC power supply,
the at least one non-heater device includes the DC/DC converter that is actuated when the battery is charged by using the DC external charger and that reduces a voltage of output power of the DC external charger and supplies the output power to the low-voltage battery, and
when charging of the battery by using the DC external charger is terminated, the controller determines that the failure diagnosis condition is satisfied.

15. The battery heater failure diagnostic device for a vehicle according to claim 7, wherein
the vehicle further includes a switch operated by an occupant and capable of switching between a start and a stop of the vehicle,
the at least one non-heater device includes a positive temperature coefficient (PTC) heater for air conditioning and an electric compressor, and
the controller determines that the failure diagnosis condition is satisfied when an operation to stop the vehicle is performed on the switch.

16. The battery heater failure diagnostic device for a vehicle according to claim 7, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

17. The battery heater failure diagnostic device for a vehicle according to claim 8, wherein
the vehicle further includes a switch operated by an occupant and capable of switching between a start and a stop of the vehicle,
the at least one non-heater device includes a positive temperature coefficient (PTC) heater for air conditioning and an electric compressor, and
the controller determines that the failure diagnosis condition is satisfied when an operation to stop the vehicle is performed on the switch.

18. The battery heater failure diagnostic device for a vehicle according to claim 8, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

19. The battery heater failure diagnostic device for a vehicle according to claim 9, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

20. The battery heater failure diagnostic device for a vehicle according to claim 17, wherein the controller executes the second control only in the case where the output value of the battery during execution of the first control is equal to or higher than a specified first determination value, and determines that the battery heater has failed in the case where an excess amount of the battery output value during execution of the second control with respect to the battery output value during execution of the first control is smaller than a specified second determination value.

* * * * *